United States Patent
Dantale

(10) Patent No.: US 8,478,733 B2
(45) Date of Patent: Jul. 2, 2013

(54) SUBSTITUTE FUNCTION IN PROJECTION LIST

(75) Inventor: Vaibhav S. Dantale, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/249,327

(22) Filed: Sep. 30, 2011

(65) Prior Publication Data

US 2013/0086019 A1   Apr. 4, 2013

(51) Int. Cl.
*G06F 17/30* (2006.01)

(52) U.S. Cl.
USPC .......................................... 707/705

(58) Field of Classification Search
USPC .......................................... 707/705
See application file for complete search history.

(56) References Cited

U.S. PATENT DOCUMENTS

| | | | |
|---|---|---|---|
| 6,823,329 B2 | 11/2004 | Kirk et al. | |
| 6,983,275 B2 | 1/2006 | Koo et al. | |
| 7,359,912 B2 | 4/2008 | Trappen et al. | |
| 7,937,384 B2 | 5/2011 | Minder et al. | |
| 2006/0235819 A1 | 10/2006 | Santosuosso | |
| 2009/0150366 A1* | 6/2009 | Basu et al. | 707/4 |
| 2010/0030728 A1 | 2/2010 | Chakkappen et al. | |
| 2012/0036111 A1* | 2/2012 | Basu et al. | 707/687 |

OTHER PUBLICATIONS

Arsalan Ayub, Find and Replace Column values in a Table using T-SQL, Sep. 20, 2007, Journey Through No-Where, pp. 1-3.*
Itzik Ben-Gan, SQL Server 2005 Beta 2 Transact-SQL Enhancements, Dec. 2004, Microsoft TechNet, pp. 1-72.*
Updating Rows, 1999, Informix Guide to SQL: Tutorial Modifying Data, pp. 1-5.*

* cited by examiner

*Primary Examiner* — Apu Mofiz
*Assistant Examiner* — Dara J Glasser
(74) *Attorney, Agent, or Firm* — Patterson & Sheridan, LLP

(57) ABSTRACT

Techniques are disclosed for retrieving database data records using a request having a substitute clause. The substitute clause replaces a value stored in a predefined column with a new value while selecting the values of the plurality of columns in a projection list. In one embodiment, the database request may utilize a pre-defined syntax for a SELECT statement that supports a substitute clause having a form of: substitute(<col name>, <expression>).

15 Claims, 3 Drawing Sheets

SELECT *, SUBSTITUTE (col4,(col4+col4*5/100)) FROM table1

| COL1 | COL2 | COL3 | COL4 | COL5 |
|------|------|------|------|------|
| abc  | X1   | TRUE | 5.25 | X2   |
| def  | Y1   | FALSE| 5.5  | Y2   |
| ghi  | Z1   | TRUE | 5.75 | Z2   |

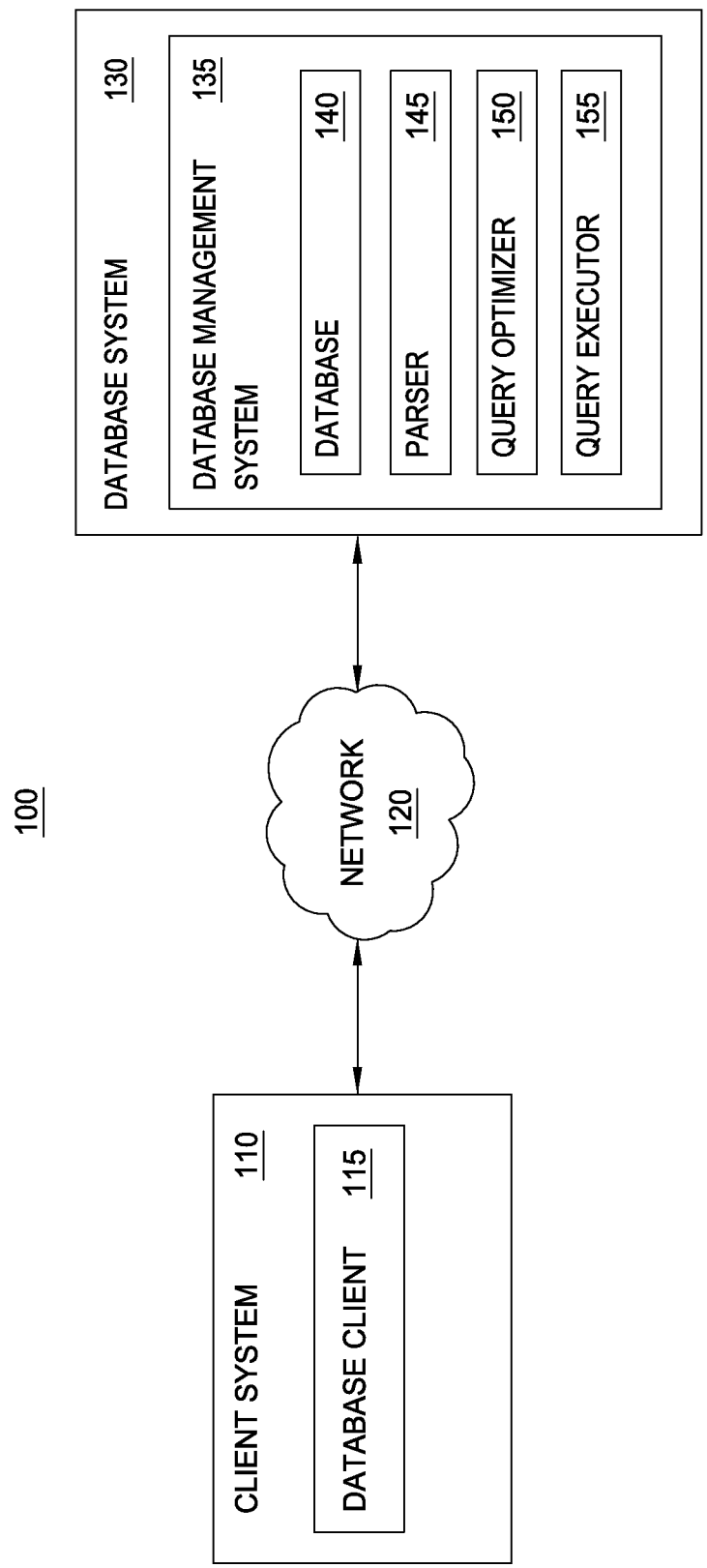

SELECT * FROM table1

| COL1 | COL2 | COL3 | COL4 | COL5 |
|------|------|-------|------|------|
| abc  | X1   | TRUE  | 5    | X2   |
| def  | Y1   | FALSE | 10   | Y2   |
| ghi  | Z1   | TRUE  | 15   | Z2   |

FIG. 2A

SELECT *, SUBSTITUTE (col4,(col4+col4*5/100)) FROM table1

| COL1 | COL2 | COL3  | COL4 | COL5 |
|------|------|-------|------|------|
| abc  | X1   | TRUE  | 5.25 | X2   |
| def  | Y1   | FALSE | 5.5  | Y2   |
| ghi  | Z1   | TRUE  | 5.75 | Z2   |

FIG. 2B

SUBSTITUTE FUNCTION IN PROJECTION LIST

BACKGROUND

Databases are computerized information storage and retrieval systems. A relational database management system is a computer database management system (DBMS) that uses relational techniques for storing and retrieving data. An object-oriented programming database is a database that is congruent with the data defined in object classes and subclasses.

Regardless of the particular architecture, a requesting entity (e.g., an application or the operating system) in a DBMS requests access to a specified database by issuing a database access request. Such requests may include, for instance, simple catalog lookup requests or transactions and combinations of transactions that operate to read, change and add specified records in the database. These requests are often made using high-level query languages such as Structured Query Language (SQL). Upon receiving such a request, the DBMS may execute the request against a corresponding database, and return any result of the execution to the requesting entity. Illustratively, SQL is used to make interactive queries for getting information from and updating a database such as International Business Machines' (IBM) DB2 and Informix, Microsoft's SQL Server, and database products from Oracle, Sybase, and Computer Associates.

The term "query" denominates a set of commands for retrieving data from a stored database. Queries take the form of a command language that allows programmers and programs to select, insert, and/or update the data of the database. Queries may specify conditions that apply to one or more columns of the database and may specify logical operations to be performed that involve multiple columns. In processing such a query, the DBMS generally searches the database for records that satisfy the conditions specified by the query and returns those records as query results for the query. Queries may also specify a projection list that includes one or more data attributes, referred interchangeably as "columns", to which the returned data result is restricted. A projection generally refers to an operation on a relational dataset such that the result of the projection results in a dataset wherein components (e.g., data record values) of the tuples (e.g., rows) are restricted to a set of attributes (e.g., columns). A projection list generally refers to the list of attribute names (e.g., column names) used in the projection.

SUMMARY

Embodiments of the invention provide a method, computer program product and system for performing an operation that includes receiving a database request having a substitute clause that specifies a column and an expression. The operation also includes, responsive to the request, retrieving one or more data records having a plurality of columns including the specified column. The operation includes evaluating the specified expression to generate an expression result corresponding to a data record. A result set is then generated, by operation of one or more computer processors. The result set includes the retrieved data records, such that, for a data record, a value for the specified column is replaced with a corresponding value based on the expression.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 1 is a block diagram illustrating a system for substituting a column returned in a database result set, according to one embodiment of the invention.

FIG. 2A illustrates a database result set for which a plurality of columns is returned, according to one embodiment of the invention.

FIG. 2B illustrates a database result set for which one of a plurality of columns is substituted, according to one embodiment of the invention.

DETAILED DESCRIPTION

Figure 3:
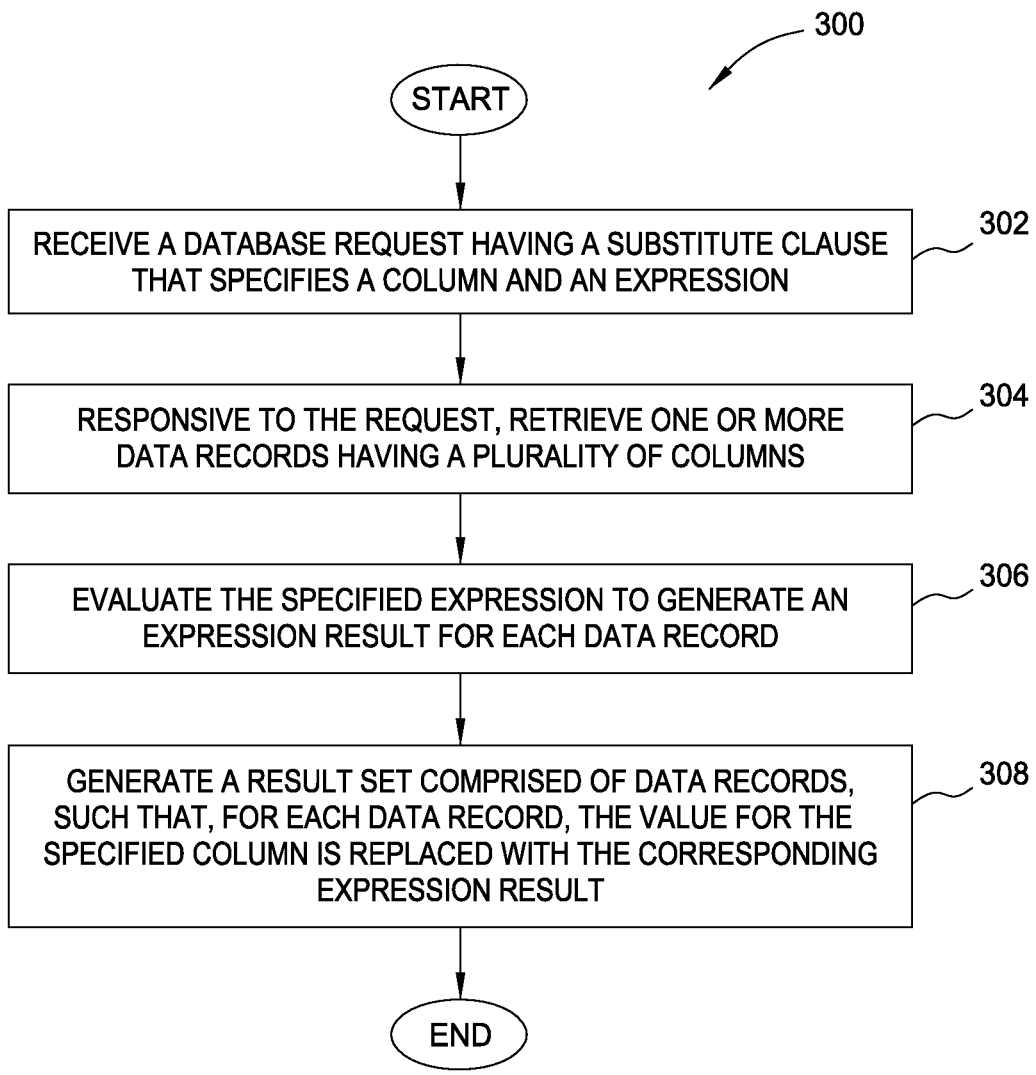
FIG. 3 is a flowchart depicting a method for substituting a column in a projection list in a database result set, according to one embodiment of the invention.

Embodiments of the invention provide techniques for providing a substitute function in a projection list of a database query, where the substitute function specifies a column and an expression. The substitute function replaces, or substitutes, values stored in the specified column with a new value from the expression, while selecting the values of a plurality of columns in the projection list. An expression is generally comprised of a sequence and/or combination of column names, data types, functions, operations, operators, and literal values, such as numerical values, character strings, bit values, date/time values, and conditional values, suitable for generating a scalar value. In one embodiment, the syntax for the described substitute function may be as follows:

substitute(column_name, expression)

One embodiment of the invention provides a database management system (DBMS) executing on a database server. The DBMS receives a database request to retrieve data records from one or more tables, where the request includes a projection operation comprised a substitute clause specifying a column and an expression. In response to the request, the DBMS retrieves one or more data records having the plurality of columns including the specified column. The DBMS generates a result set comprised of the data records, such that, for a data record retrieved, a value for the specified column is replaced with a corresponding value based on evaluating the expression. Accordingly, developers may perform an expression on a column without having to enumerate every column in the projection list.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a DBMS) or related data available in the cloud. For example, the DBMS could execute on a computing system in the cloud and provide access to one or more tables. The one or more tables may be stored at a storage location in the cloud. Doing so allows the one or more tables to be accessed from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram illustrating a system 100 for substituting a column returned in a database result set, according to one embodiment of the invention. As shown, the system 100 includes a client system 110 and a database system 130, communicatively connected via an inter-process communication (IPC) system 120. In general, the IPC system 120 is a mechanism for exchanging data among multiple threads in one or more processes, particularly between the client system 110 and the database system 130. Examples of the IPC system 120 include but are not limited to message passing, remote procedure calls (RPC), shared memory, and network sockets, such as datagram (e.g., UDP) and stream sockets (e.g., TCP). In the embodiment depicted in FIG. 1, the IPC system 120 may include a network socket utilizing a network, such as a telecommunications network, a local area network (LAN), a wide area network (WAN), and/or the Internet. While the system 100 depicted in FIG. 1 discusses the client system 110 and database system 130 as two separate entities connected by a network, it is appreciated that embodiments of the invention extend to include configurations where the database client 115 and database management system 135, described below, reside on the same system and communicate through an IPC system 120 such as shared memory.

The client system includes a database client 115. Generally, the database client 115 represents any software application capable of submitting a database query to a database management system (DBMS) 135 of the database system 130. For instance, the database client 115 could be a software application configured to allow users to generate and submit database queries. As another example, the database client 115 could be a software application configured to submit one or more predefined database queries to the DBMS 135. The DBMS 135 contains a database 140, which is a data store capable of containing a plurality of records (i.e., data) and is managed by the DBMS 135. The DBMS 135 receives database queries from the database client 115 and processes the database queries using a parser 145, query optimizer 150, and query executor 155. It is understood to one skilled in the art that additional intermediate components not shown may be utilized with the above-mentioned components of the DBMS 135 to process the database queries.

In operation, a database query is passed to the parser 145, which is configured to parse the query based on a pre-determined syntax to generate a data structure (sometimes referred to as a parse tree or query tree) representing components of the query separated into a tree format for quicker handling and processing. In one embodiment, the pre-determined syntax may include a grammar provision specifying a projection list may include a substitute clause having a plurality of arguments. The plurality of arguments specify a target column to be substituted (i.e., "substitutee", or "substituted column") and a corresponding value with which to substitute (i.e., "substituter"). The pre-determined syntax may include one or more key words reserved for providing the substitute functionality described herein. In one embodiment, the key word SUBSTITUTE may be reserved for specifying a substitute clause. Other suitable key words are contemplated. In one example, the pre-determined syntax may be specified, at least in part, to support a substitute clause as follows:

```
<query specification> ::=
    SELECT [ <set quantifier> ] <select list> <table expression>
<select list> ::=
    <asterisk>
    | <select sublist> [ { <comma> <select sublist> }... ]
<select sublist> ::=
    <derived column>
    | <qualified asterisk>
    | <substitute clause>
<qualified asterisk> ::=
    <asterisked identifier chain> <period> <asterisk>
    | <all fields reference>
<substitute clause> ::=
    SUBSTITUTE { <left paren> <column name> <comma>
    <value expression primary> <right paren> }
```

In one embodiment, a first argument specified may be a column name (referred to herein as a "substituted column"). A second argument specified may be an expression. The expression represents a scalar value that the DBMS 135 replaces for the substituted column for each data record retrieved. The expression may generally includes a sequence of column names, data types, functions, operations, operators, and literal values, such as numerical values, character strings, date/time values, array values, interval value, and Boolean values, suitable for generating a scalar value. In one embodiment, the expression may include one or more selected from the group comprising column references, set function values, scalar sub-query values, case expressions, value expressions, and cast specifications.

In one embodiment, the expression may be represented in a general form of expression(column_name [, . . . ]). The expression may be a function of one or more specified columns, such as the substituted column specified in first argument. For example, the expression may be a mathematical function operative on the substituted column, such as "SUBSTITUTE (col_price, col_price+col_price*5/100)". In another embodiment, the expression may be a function of more than one column that may include the substituted column, for example, such as: SUBSTITUTE (col_price, col_price*col_quantity*100). Additional examples are described later in detail with regards to FIGS. 2A and 2B.

According to an embodiment of the invention, when a column is specified by a substitute clause, the name of the column may be taken from the substituted column. In other words, the column name of the substituted column is maintained by its replacement. Using the example described above, the column name of the column specified by the substitute clause "SUBSTITUTE (col_price, col_price+col_price*5/100)" would remain col_price in the result set. In an alternative embodiment, when a column is specified by a substitute clause and a corresponding expression, the name of the column may be derived from the expression itself. For example, the name of the column may be "col_price+col_price*5/100".

According to one embodiment, the pre-determined syntax may support use of an "as clause" in combination with the substitute clause to enable a developer to specify a new name for the substituted column. A column specified by a substitute clause that includes an "as clause" specifying a new column name may be given the new column name. For example, the syntax may support a substitute clause having an "as-clause", such as: "SUBSTITUTE (column_name, expression) AS new_column_name." In an alternative embodiment, a column name for the substituted column may be specified as a third optional argument to the substitute clause. For example, the pre-determined syntax may support a substitute clause, such as "SUBSTITUTE (column_name, expression, new_column_name)".

Returning to FIG. 1, after the parser 145 has generated a parse tree based on the aforementioned syntax, the query tree is passed to a query optimizer 150, which is configured to evaluate a variety of possible plans for executing the query and select a query plan that efficiently executes the received database query. The query optimizer 150 may, for example, determine that building an index for a table will help the query run faster. A database index is generally a data structure that allows data in the database (e.g., in a table) to be located and accessed more efficiently. The query optimizer 150 may then generate the index, which can be used in both the processing of the current query and in processing subsequent queries against the table as well.

The query plan selected by the query optimizer 150 is then passed to the query executor 155, which is generally configured to convert the query execution plan into a series of instructions for implementing the query. The instructions may include one or more procedural calls to lower-level functions, such as access methods, for retrieving the requested data from the database. After the query execution plan has been executed by the query executor 155, a result dataset may be generated by the query executor 155 that includes one or more data records requested by the database query. The DBMS 135 returns the result dataset back to the requesting database client 115.

In one embodiment, the query executor 155 is configured to execute a projection operation having a substitute operation by evaluating a specified expression and replacing values of a specified column with the results while preserving the column order specified by the projection operation. In one embodiment, the query executor 155 includes a substitute access method configured to implement techniques for substituting columns in a result set as described herein. The substitute access method may accept a column name (e.g. substituted column) and an expression as input. The substitute access method may be configured to, for each data record retrieved by the query executor 155, replace a value for the substituted column with a corresponding value resultant from evaluating the specified expression. The query executor 155 may be configured to evaluate the specified expression using evaluation methods known to those skilled in the art and replace the specified column value with the result.

In one embodiment, the query executor 155 may modify the data type of the substituted column to be the data type of value calculated for the specified expression. For example, if the query executor 155 evaluates a specified expression to produce a datetime value, the data type of the substituted column may have a datetime data type. According to one embodiment, the query executor 155 may modify the data type of the substituted column to be the data type of the specified expression. For example, if the specified expression is a numeric, string, or boolean expression, then the data type of the substituted column may have a numeric, string, or boolean data type accordingly.

Advantageously, the substitute function so enables a developer to specify a result set with a derived column without having to enumerate every column in a projection list, thereby providing ease of development and reducing human error during development. Additionally, the substitute function reduces the instability and maintenance of a query by reducing the likelihood that a change in the order of table columns would necessitate a corresponding change in the query.

FIG. 2A illustrates a database result set 200 for which a plurality of columns is returned, according to one embodiment of the invention. The DBMS 135 may execute a database query and return a result set 200, which includes a plurality of data records 202 (e.g., tuples) and columns 204 (e.g., attributes). In this particular example, the DBMS 135 may execute a database query "SELECT*FROM table1" to produce the result set 200 having all rows of the entity table1. As shown, the result set 200 includes the columns identified as col1, col2, col3, col4, and col5, having various data types, such as string, Boolean, and numeric values.

In some cases, a developer may want to perform an expression on one or more of the columns 204 and retrieve the output of that expression, rather than the column itself, as part of the result set 200. In other words, a developer may wish to receive a result set wherein the result of an expression performed on a column replaces, or substitutes, the column itself. In one specific example, a developer wishes to perform the expression (col4+col4*5/100) on the column 206 (identified as col4) and retrieve the output of the expression instead of the column col4 as it is. Using conventional techniques known to one skilled in the art, the developer can utilize a database query such as "SELECT col1, col2, col3, (col4+col4*5/100), col5 FROM table1" to produce the desired result.

However, in cases where a table includes many columns, conventional techniques known to those skilled in the art are cumbersome and tedious for developers. To retrieve all columns of the table and perform some expression on only one column, conventional techniques require a developer to enumerate each column name in a projection list. For example, if the entity table1 mentioned above had 80 columns, a developer would have to utilize a database query such as "SELECT col1, col2, col3, (col4+col4*5/100), col5, col6, . . . col78, col79, col80 FROM table1" to produce the desired result set. This approach proves irritating to developers, increases development time, and requires that developers be meticulous in the order of the columns while writing a database query and/or application. If a developer changes the order of the columns or removes columns in the entity, corresponding changes to database queries will be necessary to prevent database errors, thereby increasing the fragility of the database query.

FIG. 2B illustrates a database result set 210 for which one of a plurality of columns is substituted, according to one embodiment of the invention. Similar to above, the DBMS 135 may execute a database query and return a result set 210, which includes a plurality of data records 212 (e.g., tuples) and columns 214 (e.g., attributes). Advantageously so, embodiments of the invention provide a syntactical technique for substituting a particular column of data values with the output of an expression while preserving order of the columns.

In one embodiment, the result set 210 includes a plurality of columns 214, wherein the values of column 216 have been replaced with the output of a specified expression. The specified expression may include any combination of numeric value expressions (e.g., mathematical operators), string value expressions (e.g., concatenation, capitalization), datetime value expressions (e.g., date retrieval, formatting), and time interval value expressions (e.g., date adding and subtracting). In the particular example shown, the DBMS 135 may execute a database query "SELECT*, SUBSTITUTE (col4, (col4+col4*5/100)) FROM table1" and generate the result set 210 having data records of the entity table1, wherein the values of the column col4 have been substituted with the result of the expression (col4+col4*5/100) for each data record. As such, rather having a column col4 with values 5, 10, 15, as seen in the result set 200 of FIG. 2A, the data result set 210 includes a column 216 having values 5.25., 5.5, 5.75, respectively, corresponding to the output of the expression for each row. While the example shown specifies a value expression comprised of at least one column reference and numeric value expression, it is contemplated that other types of expressions may be utilized according to embodiments of the invention.

In one embodiment, the expression may include a set function expression that specifies a value calculated by performing a function on a set of values. The expression may include application of the functions COUNT, AVG, MAX, MIN, SUM, and other aggregate functions to a set of data records. For example, a substitute function having one such set function expression may be specified as "SUBSTITTUE (col4, (AVG(col4)−col4))", where the value of the expression, for each data record, would be the value of col4 for the data record subtracted from the average as all col4 values, as calculated by the AVG function. In another embodiment, the expression may include a scalar sub-query derived from a query expression. According to embodiments of the invention, the query executor 155 may evaluate and/or calculate the set function expression and replace the substituted column value with the evaluated result.

In another embodiment, the expression may include a conditional expression that specifies a value conditionally selected from a set of values. In one embodiment, a ternary operation specifies a conditional expression, a first value, and a second value, wherein the value of the ternary operation is selected from the first value or second value depending on the value of the conditional expression. For example, a substitute function having one such conditional expression may be specified as "SUBSTITUTE (col4, (col4<100?col4*100:col4))", where each value of col4 is substituted with the value of the conditional expression, which may be col*4100 if the value of col4 is less than 100, or simply remains col4, if not. In another embodiment, the conditional expression may include a case expression that specifies a conditional value. The case expression may utilize a syntax such as CASE WHEN conditional-expression THEN first-value ELSE second-value, or other suitable syntaxes. According to embodiments of the invention, the query executor 155 may calculate the conditional value specified by the conditional expression and replace the substituted column value with the calculated result.

In one embodiment, the expression may include a cast expression that specifies a data conversion to a data type. The cast expression may specify that a value expression (e.g., a column value) may be converted to a specified data type. In one embodiment, the cast expression may be based on a syntax such as "CAST (column_name AS data_type)" or other suitable syntaxes. For example, a substitute function having one such cast expression may be specified as "SUBSTITUTE (col4, (CAST (col4 AS DECIMAL(8,3))))", where each value col4 is substituted with the value of the column col4 converted to a decimal value having a 8-digit precision. According to embodiments of the invention, the query executor 155 may calculate the cast expression value specified by the cast expression and replace the substituted column value with the converted result.

FIG. 3 is a flowchart depicting a method 300 for substituting a column in a projection list in a database result set, according to one embodiment of the invention. As shown, the method 300 begins at step 302, where the DBMS 135 receives a database request having a substitute clause that specifies a column and an expression.

In one embodiment, the substitute clause is part of a projection operation for the plurality of columns, and the substitute clause specifies at least one of the plurality of columns. In one embodiment, the database request comprises a SELECT statement having a column list that includes the plurality of columns and the substitute clause. The column list may include a wildcard (e.g., "*", or Kleene star) that expands to specify the plurality of columns. In one embodiment, the substitute clause comprises a SUBSTITUTE key word and a comma-delimited argument list comprised of a column reference to the specified column and the expression. Responsive to the request, at step 304, the DBMS 135 retrieves one or more data records having a plurality of columns including the specified column.

At step 306, the DBMS 135 evaluates the specified expression to generate an expression result for each of the retrieved data records. The expression may be a function having a column reference to the column specified by the substitute clause. The expression may be a function having a scalar value and based on at least one column reference. In one embodiment, the expression may be selected from the group consisting of a column reference, set function value, scalar sub-query, case expression, value expression, and cast specification.

At step 308, the DBMS 135 generates a result set comprised of the data records, such that, for each data record, a value for the specified column is replaced with a corresponding value based on the expression. Further, the DBMS 135 generates the result set such that, for each of the retrieved data records, the substituted value is the corresponding expression result generated at step 306. The DBMS 135 may include utilize the name of the substituted column, or may utilize name specified in an as-clause provided by the projection operation. After step 308, the method 300 may terminate.

Embodiments of the invention provide techniques for substituting a column in a result set to be returned, where the substituted column includes values based on a specified expression. One embodiment of the invention provides a database management system (DBMS) executing on a database server. The DBMS receives a request to retrieve one or more data records having a plurality of columns based on a projection list. The database request includes a substitute clause that specifies one of the plurality of columns and an expression. Responsive to the request, the DBMS retrieves the data records and, for each data record, evaluates the expression specified by the substitute clause to generate an expression result. The DBMS then generates a result set comprised of the data records such that the specified column is replaced with the expression. For each data record of the result, the value of the specified column is replaced with a corresponding expression result. Accordingly, the result set may include one or more expressions without having to enumerate all columns by name in the projection list.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
receiving a database request having a projection operation for all of a plurality of columns in one or more tables, wherein the projection operation comprises a SELECT statement having a column list that includes having (i) a shorthand that specifies all of the plurality of columns and (ii) a substitute clause that specifies a column from the plurality of columns and an expression, wherein the shorthand comprises a wildcard that expands to specify all of the plurality of columns, the shorthand being less than a plurality of column references to the plurality of columns;

responsive to the request, retrieving one or more data records having the plurality of columns including the specified column;

evaluating the specified expression to generate an expression result corresponding to a respective data record of the one or more data records; and generating, by operation of one or more computer processors, a result set comprised of the one of more data records having the plurality of columns, such that, for the respective data record, a value for the specified column is replaced with the corresponding expression result, wherein a number of columns in the result set is the same as the number of the plurality of columns in the one or more tables and specified by the shorthand.

2. The computer-implemented method of claim 1, wherein the substitute clause comprises a SUBSTITUTE key word and a comma-delimited argument list comprised of a column reference to the specified column and the expression.

3. The computer-implemented method of claim 1, wherein the expression comprises a function having a column reference to the specified column.

4. The computer-implemented method of claim 1, wherein the expression comprises a function having a scalar value and based on at least one column reference.

5. The computer-implemented method of claim 1, wherein the expression is selected from a group consisting of a column reference, set function value, scalar sub-query, case expression, value expression, and cast specification.

6. A computer program product, comprising:
a non-transitory computer-readable storage medium having computer-readable program code embodied therewith, the computer-readable program code comprising:
computer-readable program code configured to receive a database request having a projection operation for all of a plurality of columns in one or more tables, wherein the projection operation comprises a SELECT statement having a column list that includes (i) a shorthand that specifies all of the plurality of columns and (ii) a substitute clause that specifies a column from the plurality of columns and an expression, wherein the shorthand comprises a wildcard that expands to specify all of the plurality of columns, the shorthand being less than a plurality of column references to the plurality of columns;
computer-readable program code configured to, responsive to the request, retrieve one or more data records having the plurality of columns including the specified column;
computer-readable program code configured to evaluate the specified expression to generate an expression result corresponding to a respective data record of the one or more data records; and
computer-readable program code configured to, generate a result set comprised of the one of more data records having the plurality of columns, such that, for the respective data record, a value for the specified column is replaced with the corresponding expression result, wherein a number of columns in the result set is the same as the number of the plurality of columns in the one or more tables and specified by the shorthand.

7. The computer program product of claim 6, wherein the substitute clause comprises a SUBSTITUTE key word and a comma-delimited argument list comprised of a column reference to the specified column and the expression.

8. The computer program product of claim 6, wherein the expression comprises a function having a column reference to the specified column.

9. The computer program product of claim 6, wherein the expression comprises a function having a scalar value and based on at least one column reference.

10. The computer program product of claim 6, wherein the expression is selected from a group consisting of a column reference, set function value, scalar sub-query, case expression, value expression, and cast specification.

11. A system, comprising:
one or more computer processors;
a memory containing a program, which when executed by the one or more computer processors is configured to perform an operation comprising:
receiving a database request having a projection operation for all of a plurality of columns in one or more tables, wherein the projection operation comprises a SELECT statement having a column list that includes having (i) a shorthand that specifies all of the plurality of columns and (ii) a substitute clause that specifies a column from the plurality of columns and an expression, wherein the shorthand comprises a wildcard that expands to specify all of the plurality of columns, the shorthand being less than a plurality of column references to the plurality of columns;
responsive to the request, retrieving one or more data records having the plurality of columns including the specified column;
evaluating the specified expression to generate an expression result corresponding to a respective data record of the one or more data records; and
generating a result set comprised of the one of more data records having the plurality of columns, such that, for the respective data record, a value for the specified column is replaced with the corresponding expression result, wherein a number of columns in the result set is the same as the number of the plurality of columns in the one or more tables and specified by the shorthand.

12. The system of claim 11, wherein the substitute clause comprises a SUBSTITUTE key word and a comma-delimited argument list comprised of a column reference to the specified column and the expression.

13. The system of claim 11, wherein the expression comprises a function having a column reference to the specified column.

14. The system of claim 11, wherein the expression comprises a function having a scalar value and based on at least one column reference.

15. The system of claim 11, wherein the expression is selected from a group consisting of a column reference, set function value, scalar sub-query, case expression, value expression, and cast specification.

* * * * *